United States Patent
Uehara et al.

(10) Patent No.: US 9,203,111 B2
(45) Date of Patent: Dec. 1, 2015

(54) SECONDARY BATTERY

(75) Inventors: Makiko Uehara, Tokyo (JP); Takehiro Noguchi, Tokyo (JP); Hideaki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 13/977,805

(22) PCT Filed: Sep. 22, 2011

(86) PCT No.: PCT/JP2011/071693
§ 371 (c)(1),
(2), (4) Date: Jul. 1, 2013

(87) PCT Pub. No.: WO2012/127717
PCT Pub. Date: Sep. 27, 2012

(65) Prior Publication Data
US 2013/0280600 A1    Oct. 24, 2013

(30) Foreign Application Priority Data

Mar. 24, 2011   (JP) .................. 2011-065845

(51) Int. Cl.
*H01M 10/0566* (2010.01)
*H01M 4/505* (2010.01)
(Continued)

(52) U.S. Cl.
CPC ............ *H01M 10/0566* (2013.01); *H01M 4/13* (2013.01); *H01M 4/505* (2013.01); *H01M 4/525* (2013.01); *H01M 10/052* (2013.01); *H01M 10/0525* (2013.01); *H01M 10/0567* (2013.01);
(Continued)

(58) Field of Classification Search
CPC ..................... H01M 10/0566; H01M 10/0525; H01M 4/505; H01M 4/525
USPC ........................................................ 429/200
See application file for complete search history.

(56) References Cited

U.S. PATENT DOCUMENTS

2006/0124973 A1* 6/2006 Arai et al. ..................... 257/223
2006/0286459 A1* 12/2006 Zhao et al. .................... 429/326
(Continued)

FOREIGN PATENT DOCUMENTS

CN        1765732 A       5/2006
CN      101373832 A       2/2009
(Continued)

OTHER PUBLICATIONS

Communication dated Aug. 6, 2014 issued by the European Patent Office in counterpart Application No. 11861599.6.
(Continued)

*Primary Examiner* — Stewart Fraser
(74) *Attorney, Agent, or Firm* — Sughrue Mion, PLLC

(57) ABSTRACT

The object of an exemplary embodiment of the invention is to provide a secondary battery which contains a positive electrode active material operating at a potential of 4.5 V or higher and which has good cycle property at a high temperature. An exemplary embodiment of the invention is a secondary battery, comprising a positive electrode that can absorb and desorb lithium and an electrolyte liquid; wherein the positive electrode comprises a positive electrode active material that operates at a potential of 4.5 V or higher with respect to lithium; and wherein the electrolyte liquid comprises a fluorinated ether represented by a prescribed formula and a cyclic-type sulfonate represented by a prescribed formula.

15 Claims, 1 Drawing Sheet

(51) Int. Cl.
*H01M 4/525* (2010.01)
*H01M 10/052* (2010.01)
*H01M 10/0567* (2010.01)
*H01M 10/0569* (2010.01)
*H01M 4/13* (2010.01)
*H01M 10/0525* (2010.01)
*H01M 4/02* (2006.01)

(52) U.S. Cl.
CPC .... *H01M 10/0569* (2013.01); *H01M 2004/028* (2013.01); *H01M 2300/0025* (2013.01); *Y02E 60/122* (2013.01); *Y02T 10/7011* (2013.01)

(56) References Cited

U.S. PATENT DOCUMENTS

2009/0253049 A1* 10/2009 Ishikawa et al. .............. 429/347
2010/0221615 A1 9/2010 Zhao et al.

FOREIGN PATENT DOCUMENTS

| CN | 101409346 A | 4/2009 |
|----|-------------|--------|
| CN | 101557019 A | 10/2009 |
| EP | 2109177 A1 | 10/2009 |
| JP | 2003-100342 A | 4/2003 |
| JP | 2003-168480 A | 6/2003 |
| JP | 2005-149750 A | 6/2005 |
| JP | 2005-251677 A | 9/2005 |
| JP | 2006-344390 A | 12/2006 |
| JP | 2006-344509 A | 12/2006 |
| JP | 2008-176987 A | 7/2008 |
| JP | 2009-252545 A | 10/2009 |
| JP | 2010-238510 A | 10/2010 |
| KR | 1020090106993 A | 10/2009 |
| RU | 2412506 C1 | 2/2011 |

OTHER PUBLICATIONS

Communication dated Aug. 22, 2014, issued by the Korean Intellectual Property Office in counterpart Application No. 1020137020190.
Sebastien Patoux et al., "High voltage spinel oxides for Li-ion batteries: From the material research to the application", Journal of Power Sources, 2009, pp. 344-352, vol. 189.
International Search Report of PCT/JP2011/071693 dated Dec. 27, 2011.
Communication dated Dec. 2, 2014 from the Russian Patent Office in counterpart application No. 2013147405.
Communication dated Mar. 20, 2015 from the State Intellectual Property Office of the People's Republic of China in counterpart application No. 201180069534.4.
Communication dated Sep. 17, 2015 from the State Intellectual Property Office of the P.R.C. in counterpart application No. 201180069534.4.

* cited by examiner

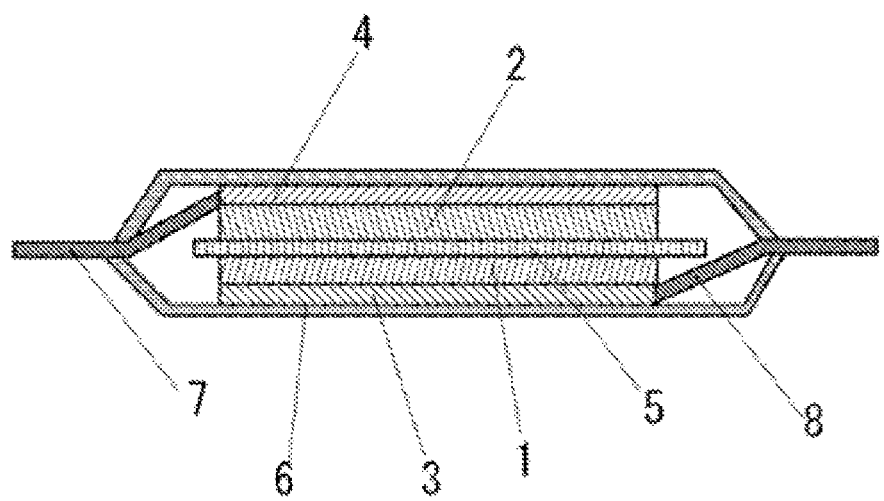

SECONDARY BATTERY

CROSS REFERENCE TO RELATED
APPLICATIONS

This is a National Stage of International Application No. PCT/JP2011/071693 filed Sep. 22, 2011, claiming priority based on Japanese Patent Application No. 2011-065845 filed Mar. 24, 2011, the contents of all of which are incorporated herein by reference in their entirety.

TECHNICAL FIELD

The present invention relates to a secondary battery, and particularly relates to a lithium ion secondary battery.

BACKGROUND ART

Lithium ion secondary batteries have a characteristic of small size and large capacity, and are widely used as power supplies of portable telephones and notebook-sized personal computers. However, while urgent advancement of portable electronic equipments and utilization to electronic vehicles are realized in recent years, further improvements in energy density are required.

Examples of the method for improving energy density include using an active material that has high capacity, increasing an operating potential of the battery, and improving charge/discharge efficiency as well as battery cycle life. From among these, methods, method that increases an operating potential of the battery is effective for downsizing and weight-saving a battery module used for electronic vehicles or the like because an assembled battery having a smaller number of serially-connected batteries than a conventional assembled battery can be provided.

As a conventional positive electrode active material for a lithium ion secondary battery, materials such as lithium cobaltate and lithium manganite, whose operating potential is in the 4 V class (average operating potential=3.6 to 3.8 V: with respect to lithium potential) are used. This is because the developed potential is defined by oxidation and reduction reaction of Co ion or Mn ion ($Co^{3+}\leftarrow\rightarrow Co^{4+}$ or $Mn^{3+}\leftarrow\rightarrow Mn^{4+}$). In contrast, it is known, for example, that operating potential of 5 V class (average operating potential=4.6 V or more: with respect to lithium potential) can be realized by using a spinel compound obtained by substituting Mn of a lithium manganate to Ni, Co, Fe, Cu, Cr or the like as the active material. In this compound, Mn exists in a state of quaternary, and the operating potential is defined by oxidation and reduction reaction of the substituting atom instead of oxidation and reduction reaction of Mn.

The capacity of $LiNi_{0.5}Mn_{1.5}O_4$ is 130 mAh/g or more, and the average operating voltage is 4.6 V or higher with respect to metal lithium, and the material is expected as a material having high energy density. Further, the spinel type lithium manganese oxide is advantageous in that it has a three-dimensional lithium spreading path, that it has thermodynamic stability higher than the other compound, and that it can be easily synthesized.

Patent Documents 1 to 2 disclose a secondary battery in which a fluorinated compound such as a fluorinated ether, a fluorinated carbonate, a fluorinated ester, a fluorinated acrylate, or a fluorinated cyclic-type carbonate is used as a solvent in the case of using a positive electrode active material showing charging and discharging field of 4.5 V or higher.

Patent Documents 3 and 4 show adding a cyclic-type sulfonate to an electrolyte liquid in order to improve the preserving property at high temperature.

Patent Document 5 discloses using an electrolyte liquid containing a cyclic-type sulfonate derivative in a battery in which a 5 V class positive electrode active material is used.

Non-Patent Document 1 shows that capacity of self-discharge during stored state is reduced by adding 1,3-propane sultone in a cell in which a 5 V class positive electrode active material and Li as the opposite electrode are used.

As described above, the effect of the fluorinated ether as a solvent that is resistant to oxidation is known, and the cyclic-type sulfonate is known as an additive for forming a stable film on an electrode. Patent Document 6 discloses an example of using an electrolyte liquid containing both a fluorinated ether and a cyclic-type sulfonate. However, although Patent Document 6 only shows the improvement of flame retardancy by the fluorinated ether in the 4 V class positive electrode and the improvement of discharge capacity ratio of high rate and low rate, it does not disclose the effect of improving operating life in the case of using a positive electrode having high potential.

CITATION LIST

Patent Document

Patent Document 1: JP 2003-100342 A
Patent Document 2: JP 2003-168480 A
Patent Document 3: JP 2005-149750 A
Patent Document 4: JP 2005-251677 A
Patent Document 5: JP 2006-344390 A
Patent Document 6: JP 2008-176987 A Non-Patent Document Non-Patent Document 1: Sebastien Patoux et al, Journal of Power Sources, vol. 189, pp. 344-352, 2009

SUMMARY OF THE INVENTION

Problem to be Solved by the Invention

In the case of using a positive electrode active material operating at high potential, at a contact portion of the positive electrode and the electrolyte liquid, decomposition reaction of the electrolyte liquid occurs, which results in the deterioration of charge and discharge cycle property. However, a lithium ion secondary battery, in which a conventional positive electrode active material showing a high potential of 4.5 V or higher is used, does not have a sufficient characteristic regarding cycle property at a high temperature such as 45° C. or higher.

Thus, the object of an exemplary embodiment of the invention is to provide a secondary battery which contains a positive electrode active material operating at a potential of 4.5 V or higher and which has good cycle property at a high temperature.

Means of Solving the Problem

An exemplary embodiment of the invention is a secondary battery, comprising a positive electrode that can absorb and desorb lithium and an electrolyte liquid;
wherein the positive electrode comprises a positive electrode active material that operates at a potential of 4.5 V or higher with respect to lithium; and wherein the electrolyte liquid comprises a fluorinated ether represented by following formula (1) and a cyclic-type sulfonate represented by following formula (2):

$$R_1\text{—}O\text{—}R_2 \quad (1)$$

wherein, in formula (1), $R_1$ and $R_2$ each independently denote an alkyl group or an fluorinated alkyl group, and at least one of $R_1$ and $R_2$ is a fluorinated alkyl group; and

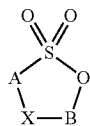

(2)

wherein, in formula (2), A and B each independently denote an alkylene group or an fluorinated alkylene group, and X denotes single bond or —$OSO_2$— group.

Effect of the Invention

According to an exemplary embodiment of the invention, a secondary battery in which capacity decrease during cycles at a high temperature is reduced and in which a positive electrode material shows a high potential of 4.5 V or higher can be provided.

BRIEF DESCRIPTION OF DRAWINGS

FIG. 1 is a cross-sectional view of one embodiment of a secondary battery according to the present invention.

MODE FOR CARRYING OUT THE INVENTION

A secondary battery of an exemplary embodiment of the invention has a positive electrode that can absorb and desorb lithium, and an electrolyte liquid. Also, the positive electrode contains a positive electrode active material that operates at a potential of 4.5 V or higher with respect to lithium. The electrolyte liquid contains a fluorinated ether represented by formula (1) and a cyclic-type sulfonate represented by formula (2).

In an exemplary embodiment of the invention, an electrolyte liquid containing a fluorinated ether represented by formula (1) and a cyclic-type sulfonate represented by formula (2) is used. It is inferred not only that the fluorinated ether functions as a solvent that is resistant to oxidation because it contains these, but also that a new effect that the fluorinated ether assists film formation of the cyclic-type sulfonate is obtained. This is a characteristic which provides more significant effect in the case of using a positive electrode active material of high potential, in which decomposition of the electrolyte liquid is a big problem.

[Electrolyte liquid]

An electrolyte liquid in an exemplary embodiment of the invention contains a fluorinated ether represented by formula (1) and a cyclic-type sulfonate represented by formula (2).

The fluorinated ether is represented by following formula (1):

$$R_1\text{—}O\text{—}R_2 \quad (1)$$

wherein, in formula (1), $R_1$ and $R_2$ each independently denote an alkyl group or an fluorinated alkyl group, and at least one of $R_1$ and $R_2$ is a fluorinated alkyl group.

In formula (1), the carbon number of the alkyl group is preferably 1 to 10, is more preferably 1 to 8, is further preferably 1 to 6, and is particularly preferably 1 to 4. Also, the alkyl group includes a straight-chain-type, branched-chain-type or cyclic-chain-type one, but is preferably straight-chain-type.

The fluorinated alkyl group means a substituted alkyl group having a structure in which at least one hydrogen atom of an non-substituted alkyl group is substituted by fluorine atom. Also, the fluorinated alkyl group includes a straight-chain-type, branched-chain-type or cyclic-chain-type one, but is preferably straight-chain-type.

In formula (1), the carbon number of the fluorinated alkyl group is preferably 1 to 10, is more preferably 1 to 8, is further preferably 1 to 6, and is particularly preferably 1 to 4.

Also, the content of fluorine atom in the fluorinated alkyl group is preferably 50% or more with respect to a total of fluorine atom and hydrogen atom, and is more preferably 60% or more. When the content of fluorine atom is large, voltage resistance is further improved, and deterioration of the battery capacity after cycles can be effectively reduced even in the case of using a positive electrode active material operating at a potential of 4.5 V or higher with respect to lithium.

Also, the total of the carbon numbers of $R_1$ and $R_2$ is preferably 10 or less.

Example of the fluorinated ether include, for example, $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$ and $CF_3CHFCF_2CH_2OCHF_2$.

From the viewpoint of voltage resistance and compatibility with another electrolyte, the fluorinated ether is preferably represented in following formula (3):

$$X^1\text{—}(CX^2X^3)_n\text{—}CH_2O\text{—}CX^4X^5\text{—}CX^6X^7\text{—}X^8 \quad (3)$$

wherein, in formula (3), n is 1 to 8 and $X^1$ to $X^8$ are each independently fluorine atom or hydrogen atom, in which at least one of $X^1$ to $X^3$ is fluorine atom and at least one of $X^4$ to $X^8$ is fluorine atom.

In formula (3), $X^2$ and $X^3$ may be respectively independent in every n.

Also, from the viewpoint of voltage resistance and compatibility with another electrolyte, the fluorinated ether is preferably represented in following formula (4):

$$H\text{—}(CY^1Y^2\text{—}CY^3Y^4)_n\text{—}CH_2O\text{—}CY^5Y^6\text{—}CY^7Y^8\text{—}H \quad (4)$$

wherein, in formula (4), n is 1, 2, 3 or 4, and $Y^1$ to $Y^8$ is each independently fluorine atom or hydrogen atom, in which at least one of $Y^1$ to $Y^4$ is fluorine atom and at least one of $Y^5$ to $X^8$ is fluorine atom.

In formula (4), $Y^1$ to $Y^4$ may be respectively independent in every n.

Also, in formula (3), the atom ratio of fluorine atom and hydrogen atom ((total number of fluorine atom)/(total number of hydrogen atom)) is preferably 1 or more. Further, in formula (3), it is preferable that n be 1 to 4 and that the atom ratio of fluorine atom and hydrogen atom ((total number of fluorine atom)/(total number of hydrogen atom)) be 1.8 to 3.0. Further, in the case of using a 5 V class positive electrode, when an electrolyte liquid containing a fluorinated ether and a cyclic-type sulfonate was used, a problem occurred in which a lot of gas was generated. Thus, when the substituted number of fluorine atom is small, oxidation decomposition occurs easily, and when the substituted number of fluorine atom is large, reduction decomposition occurs easily. When ((total number of fluorine atom)/(total number of hydrogen atom)) is set to be 1.8 to 3.0, the gas generation can be suppressed.

The fluorinated ether can be recognized as a solvent, but, for example, the content of the fluorinated ether in the total solvent composition is 0.1 to 70 mass %. Also, the content of the fluorinated ether in the total solvent composition is preferably 5 to 60 mass %, is more preferably 7 to 50 mass %, and is further preferably 10 to 40 mass %. When the content of the fluorinated ether is 60 mass % or less, the conductivity of the electrolyte liquid is easily improved. When the content of the fluorinated ether is 5 mass % or more, the oxidation resistance of the electrolyte liquid is easily improved.

The cyclic-type sulfonate is represented by following formula (2):

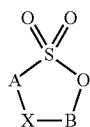

(2)

wherein, in formula (2), A and B each independently denote an alkylene group or an fluorinated alkylene group, and X denotes single bond or —OSO$_2$— group.

In formula (2), the carbon number of the alkylene group is, for example, 1 to 8, is preferably 1 to 6, and is more preferably 1 to 4.

The fluorinated alkylene group means a substituted alkylene group having a structure in which at least one hydrogen atom of an non-substituted alkylene group is substituted by fluorine atom. In formula (2), the carbon number of the fluorinated alkylene group is, for example, 1 to 8, is preferably 1 to 6, and is more preferably 1 to 4.

Note that, the direction of the —OSO$_2$— group may not matter.

In formula (2), in the case where X is single bond, the cyclic-type sulfonate is a cyclic-type monosulfonate, and the cyclic-type monosulfonate is preferably a compound represented by following formula (5):

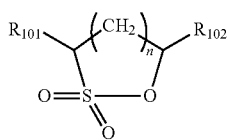

(5)

wherein, in formula (5), $R_{101}$ and $R_{102}$ each independently denote hydrogen atom, fluorine atom or an alkyl group with a carbon number of 1 to 4, and n is 1, 2, 3 or 4.

In formula (2), in the case where X is —OSO$_2$— group, the cyclic-type sulfonate is a cyclic-type disulfonate, and the cyclic-type disulfonate is preferably a compound represented by following formula (6):

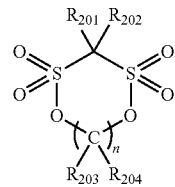

(6)

wherein, in formula (6), $R_{201}$ to $R_{204}$ each independently denote hydrogen atom, fluorine atom or an alkyl group with a carbon number of 1 to 4, and n is 1, 2, 3 or 4.

Examples of the cyclic-type sulfonate include, for example, monosulfonates such as 1,3-propane sultone, 1,2-propane sultone, 1,4-butane sultone, 1,2-butane sultone, 1,3-butane sultone, 2,4-butane sultone and 1,3-pentane sultone (in the case where X in formula (2) is single bond); and disulfonates such as methylene methanedisulfonate and ethylene methanedisulfonate (in the case where X in formula (2) is —OSO$_2$— group). Among these, from the viewpoint of film formation effect, availability and cost, 1,3-propane sultone, 1,4-butane sultone, and methylene methanedisulfonate are preferable.

The content of the cyclic-type sulfonate in the electrolyte liquid is preferably 0.01 to 10 mass % and is more preferably 0.1 to 5 mass %. When the content of the cyclic-type sulfonate is 0.01 mass % or more, a film can be more effectively formed on the surface of the positive electrode and the decomposition of the electrolyte liquid can be suppressed. When the content of the cyclic-type sulfonate is 10 mass % or less, a first capacity that is a nearly theoretical capacity can be provided by charging at 20° C. by adjusting the viscosity and the electroconductivity of the electrolyte liquid to a more appropriate range.

Examples of the solvent which can be used together with the fluorinated ether for the electrolyte liquid include, for example, aprotic solvents which include cyclic-type carbonates such as propylene carbonate (PC), ethylene carbonate (EC), butylene carbonate (BC) and vinylene carbonate (VC); linear-type carbonates such as dimethyl carbonate (DMC), diethyl carbonate (DEC), ethyl methyl carbonate (EMC) and dipropyl carbonate (DPC); propylene carbonate derivatives; and aliphatic carboxylates such as methyl formate, methyl acetate and ethyl propionate. This aprotic solvent can be used alone, or in combination with two or more kinds.

The electrolyte liquid preferably contains a carbonate compound as the solvent. By using the carbonate compound, the ion dissociation of the electrolyte liquid is improved and also the viscosity of the electrolyte liquid is decreased. Therefore, ionic mobility can be improved. As mentioned above, examples of the carbonate compound include cyclic-type carbonates and linear-type carbonates. As mentioned above, examples of the carbonate compound include, for example, ethylene carbonate (EC), propylene carbonate (PC), butylene carbonate (BC), vinylene carbonate (VC), dimethyl carbonate (DMC), diethyl carbonate (DEC), ethyl methyl carbonate (MEC) and dipropyl carbonate (DPC). The electrolyte liquid preferably contains a carbonate compound as a main solvent. The content of the carbonate compound in the total solvent composition is preferably 30 to 90 mass %, is more preferably 35 to 85 mass %, and is further preferably 40 to 80 mass %.

Examples of the solvent other than those mentioned above include, for example, γ-butyrolactones such as γ-lactone; linear-type ethers such as 1,2-ethoxyethane (DEE) and ethoxy methoxy ethane (EME); cyclic-type ethers such as tetrahydrofuran and 2-methyl tetrahydrofuran; aprotic organic solvents such as dimethylsulfoxide, 1,3-dioxolan, formamide, acetamide, dimethylformamide, dioxolane, acetonitrile, propylnitrile, nitromethane, ethyl monoglyme, phosphoric acid triesters, trimethoxy methane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, N-methylpyrrolidone and fluorinated carboxylates. These can be used alone, or in combination with two or more kinds.

An electrolyte liquid in an exemplary embodiment of the invention particularly preferably contains a fluorinated ether, a cyclic-type sulfonate and a carbonate compound. There is an advantage that the ion dissociation of the electrolyte liquid is improved because the carbonate compound has a large specific dielectric constant, the ion dissociation of the electrolyte liquid is improved, and further that the ionic mobility is improved because the viscosity of the electrolyte liquid is decreased. However, when the carbonate compound having a carbonate structure is used as the electrolyte liquid, the carbonate compound tends to be decomposed to easily generate a gas consisting of $CO_2$. In particular, in the case of a secondary battery containing a positive electrode active material operating at a potential of 4.5V or higher, the problem of the gas generation occurs. Thus, in an exemplary embodiment of the invention, by using an electrolyte liquid containing a cyclic-type sulfonate and a fluorinated ether together with a carbonate compound, the effect of improving the cycle property can be obtained even in the case of containing a positive electrode active material operating at a potential of 4.5 V or higher. It is inferred that this is an effect obtained because the fluorinated ether not only functions as the solvent, but also assists film formation of the cyclic-type sulfonate.

Examples of the lithium salt dissolved in the electrolyte liquid include, for example, but should not particularly be limited to, $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_3$, $LiN(CF_3SO_2)_2$, $LiN(C_2F_5SO_2)_2$, $LiB_{10}Cl_{10}$, lithium salts of lower aliphatic carboxylic acids, chloroborane lithium, lithium tetraphenylborate, LiCl, LiBr, LiI, LiSCN and LiCl. The concentration of the lithium salt in the electrolyte liquid is preferably 0.5 to 1.5 mol/l. By setting the concentration of the lithium salt to this range, the density, the viscosity, the electroconductivity and the like are easily adjusted to appropriate range.

[Positive Electrode]

A secondary battery of an exemplary embodiment of the invention has a positive electrode containing a positive electrode active material that operates at a potential of 4.5 V or higher.

The positive electrode active material operating at a potential of 4.5 V or higher with respect to lithium can be selected, for example, by a following method. First, a positive electrode containing a positive electrode active material and Li metal are oppositely disposed through a separator in a battery and an electrolyte liquid is injected to produce a battery. After that, when charge and discharge are carried out at a constant current of, for example, 5 mAh/g per the mass of the positive electrode active material in the positive electrode, the active material which has a charge and discharge capacity of 10 mAh/g or more per the mass of the active material at a potential of 4.5 V or higher with respect to lithium can be assume to be a positive electrode active material operating at a potential of 4.5 V or higher with respect to lithium. Also, when charge and discharge are carried out at a constant current of 5 mAh/g per the mass of the positive electrode active material in the positive electrode, the charge and discharge capacity per the mass of the active material at a potential of 4.5 V or higher with respect to lithium is preferably 20 mAh/g or more, is more preferably 50 mAh/g or more, and is further preferably 100 mAh/g or more. The shape of the battery can be, for example, coin-type.

As the positive electrode active material operating at a potential of 4.5 V or higher, a lithium manganese complex oxide represented by following formula (7) can be used:

$$Li_a(M_xMn_{2-x-y}Y_y)(O_{4-w}Z_w) \quad (7)$$

wherein, in formula (7), x, y, a and w satisfy $0.4 \leq x \leq 1.2$, $0 \leq y$, $x+y<2$, $0 \leq a \leq 1.2$ and $0 \leq w \leq 1$, M comprises at least one selected from the group consisting of Co, Ni, Fe, Cr and Cu, Y is at least one selected from the group consisting of Li, B, Na, Mg, Al, Ti, Si, K and Ca, and Z is at least one selected from the group consisting of F and Cl.

Note that, in formula (7), when a is 0, Y contains at least Li and y satisfies $0<y$. When y is 0, a satisfies $0<a$.

From the viewpoint of obtaining sufficient capacity and providing high operating life, the positive electrode active material operating at a potential of 4.5 V or higher is preferably a lithium manganese complex oxide represented by following formula (8):

$$LiNi_xMn_{2-x-y}A_yO_4 \quad (8)$$

wherein, in formula (8), x and y satisfy $0.4<x<0.6$ and $0 \leq y<0.3$, and A is at least one selected from the group consisting of Li, B, Na, Mg, Al, Ti and Si.

In formula (8), y preferably satisfies $0 \leq y<0.2$.

Preferable examples of the positive electrode active material operating at a potential of 4.5 V or higher specifically includes, for example, $LiNi_{0.5}Mn_{1.5}O_4$, $LiCrMnO_4$, $LiFeMnO_4$, $LiCoMnO_4$, and $LiCu_{0.5}Mn_{1.5}O_4$. These positive electrode active materials have high capacity.

Also, examples of the positive electrode active material operating at a potential of 4.5 V or higher include spinel-type materials and olivine-type materials. Examples of the spinel-type positive electrode active material include, for example, $LiNi_{0.5}Mn_{1.5}O_4$, $LiCr_xMn_{2-x}O_4$ ($0.4 \leq x \leq 1.1$), $LiFe_xMn_{2-x}O_4$ ($0.4 \leq x \leq 1.1$), $LiCu_xMn_{2-x}O_4$ ($0.3 \leq x \leq 0.6$) or $LiCo_xMn_{2-x}O_4$ ($0.4 \leq x \leq 1.1$) and solid solutions of these. Also, examples of the olivine-type positive electrode active material include, for example, $LiCoPO_4$ or $LiNiPO_4$.

Also, examples of the positive electrode active material operating at a potential of 4.5 V or higher include Si complex oxides, and examples of the Si complex oxides include, for example, $Li_2MSiO_4$ (M: at least one of Mn, Fe and Co).

Also, examples of the positive electrode active material operating at a potential of 4.5 V or higher include materials having a layer structure, and examples of the positive electrode active material having a layer structure include, for example, $Li(M1_xM2_yMn_{2-x-y})O_2$ (M1: at least one selected from the group consisting of Ni, Co and Fe, M2 is at least one selected from the group consisting of Li, Mg and Al, $0.1<x<0.5$, $0.05<y<0.3$).

The specific surface area of the positive electrode active material is, for example, 0.01 to 5 $m^2/g$, is preferably 0.05 to 4 $m^2/g$, is more preferably 0.1 to 3 $m^2/g$, and is further preferably 0.2 to 2 $m^2/g$. When the specific surface area is in this range, the contact area with the electrolyte liquid can be adjusted to a suitable range. In other words, when the specific surface area is 0.01 $m^2/g$ or more, adsorption and desorption of a lithium ion can be easily performed smoothly and resistance can be further decreased. Also, when the specific surface area is 5 $m^2/g$ or less, it can be suppressed to promote the decomposition of the electrolyte liquid and to elute a constituent element of the active material.

The central particle diameter of the positive electrode active material is preferably 0.1 to 50 μm, and is more preferably 0.2 to 40 μm. When the particle diameter is 0.1 μm or more, the elution of the constituent element such as Mn can be further suppressed, and the deterioration by the contact with the electrolyte liquid can also be further suppressed. Also, when the particle diameter is 50 μm or less, adsorption and desorption of a lithium ion is easily performed smoothly and resistance can be further decreased. The measurement of the particle diameter can be carried out by a laser diffraction/scattering type particle size distribution measuring apparatus.

As described above, the positive electrode mainly contains a positive electrode active material operating at a potential of 4.5 V or higher with respect to lithium, but may also contain a 4 V class active material.

The positive electrode slurry can be formed, for example, by disposing a positive electrode slurry prepared by mixing a positive electrode active material, an electroconductive-imparting agent on a collector.

Examples of the electroconductive-imparting agent include carbon materials such as acetylene black, carbon black, fibrous carbon and graphite, and further metal materials such as Al and powders of the electroconductive oxide.

The positive electrode binder is not particularly limited. For example, polyvinylidene fluorides (PVdF), vinylidene fluoride-hexafluoropropylene copolymers, vinylidene fluoride-tetrafluoroethylene copolymers, styrene-butadiene rubbers, polytetrafluoroethylenes, polypropylenes, polyethylenes, polyimides and polyamide-imides can be used.

The content of the electroconductive-imparting agent in the positive electrode slurry can be, for example, 1 to 10 mass %. Also, the content of the binder in the positive electrode slurry can be, for example, 1 to 10 mass %. When they are in this range, an adequate content ratio of the active material in the electrode can be easily acquired and a sufficient capacity per unit mass can be easily obtained.

The collector is not particularly limited. However, aluminum, nickel, copper, silver and alloys thereof are preferable from electrochemical stability. Examples of the shape thereof include foil, flat plate and mesh.

[Negative Electrode]

A negative electrode active material is not particularly limited as long as it can absorb and desorb lithium ion, and known materials can be used, for example. Specific example of the negative electrode active material include carbon materials such as graphite, coke and hard carbon; lithium alloys such as lithium-aluminum alloy, lithium-lead alloy and lithium-tin alloy; lithium metal; Si; and metal oxides having a potential lower than the positive electrode active material such as $SnO_2$, $SnO$, $TiO_2$, $Nb_2O_3$ and $SiO$.

The negative electrode can be formed, for example, by applying a negative electrode slurry prepared by mixing a negative electrode active material, a electroconductive-imparting agent and a negative electrode binder to a negative electrode collector.

Examples of the electroconductive-imparting agent include powders of carbon materials and electroconductive oxides.

The negative electrode binder is not particularly limited. For example, polyvinylidene fluorides vinylidene fluoride-hexafluoroethylene copolymers, vinylidene fluoride-tetrafluoroethylene copolymers, styrene-butadiene rubbers, polytetrafluoroethylenes, polypropylenes, polyethylenes, polyimides, polyamide-imides and polyacrylic acids can be used. Among these, a polyimide or a polyamide-imide is preferable because it has strong binding property. The amount of the negative electrode binder that is used is preferably 5 to 25 parts by mass with respect to 100 parts by mass of the negative electrode active material from the standpoint of "sufficient binding force" and "high energy" which are trade-offs to each other.

As the negative electrode collector, aluminum, nickel, copper, silver and alloys thereof are preferable from the standpoint of electrochemical stability. Examples of the shape thereof include foil, flat plate and mesh.

Examples of the method of forming the negative electrode active material layer include doctor blade method, die coater method, CVD method, and sputtering method. A negative electrode active material layer is first formed, and a thin film of aluminum, nickel or an alloy thereof is thereafter formed by vapor deposition, sputtering or the like to obtain the negative electrode.

[Separator]

A separator is not particularly limited, and known separators can be used, for example. Specifically, as the separator, porous polymer films of a polyolefin such as a polyethylene or a polypropylene can be used, for example.

[Package]

A package can appropriately be selected as long as it has stability to the electrolyte liquid and sufficient moisture barrier property. For example, in the case of the stacked laminate type secondary battery, a laminate film of a polypropylene, polyethylene or the like which is coated with aluminum or silica can be used as the package. In particular, an aluminum laminate film is preferably used from a viewpoint of suppressing volume expansion.

[Secondary Battery]

A secondary battery can have a configuration in which a positive electrode containing a positive electrode active material, a negative electrode containing a negative electrode active material, a separator as an insulating body which is narrowly sandwiched between the positive electrode and the negative electrode, and an electrolyte liquid having a lithium ion conductivity are sealed in a package. By applying a voltage to the positive electrode and the negative electrode, the positive electrode active material desorbs lithium ion and the negative electrode absorbs lithium ion, resulting that the battery comes to be in charged state. Discharged state is a state opposite to the charge state.

Examples of the shape of the battery include, for example, tubular-type, square-shape, coin-type, button-type and laminate-type. Examples of the package of the battery include, for example, stainless steel, iron, aluminum, titanium or an alloying thereof, or plated finished articles thereof. Examples of the plating include, for example, nickel plating.

For example, a secondary battery can be produced in a dry air or in an inert gas atmosphere by stacking a negative electrode and a positive electrode with a separator placed between them or by winding the stacked body, by inserting it to a package, by injecting an electrolyte liquid, and by sealing it with a flexible film composed of a stacked body of a synthetic resin and a metal foil, or the like.

The configuration of the secondary battery is not particularly limited. For example, it can be spiral-type in which the positive electrode and negative electrode oppositely disposed through a separator are wound, stacked-type in which these are stacked, or the like.

FIG. 1 shows a laminate-type secondary battery as one example of the secondary battery. Separator 5 is sandwiched between a positive electrode, which consists of positive electrode active material layer 1 containing a positive electrode active material and of positive electrode collector, and a negative electrode, which consists of negative electrode active material layer 2 containing a negative electrode active material and of negative electrode collector. Positive electrode collector 3 is connected to positive electrode lead terminal 8, and negative electrode collector 4 is connected to negative electrode lead terminal 7. Package laminate 6 is used as the package, and the secondary battery is filled with an electrolyte liquid.

Examples of the laminating resin film used for the laminate-type include, for example, aluminum, aluminum alloys and titanium foil. Example of the material of the heat welded part of the metal laminating resin film include, for example, thermoplastic polymer materials such as polyethylenes, polypropylenes and polyethylene terephthalates. Also, the metal laminating resin layer and the metal foil layer are not limited to 1 layer, respectively, and may be two or more layers.

EXAMPLES

As follows, the Examples of an exemplary embodiment of the invention are described in detail, but an exemplary embodiment of the invention is not limited to the following Examples.

Example 1

(Production of Positive Electrode)

First, powders of $MnO_2$, NiO, $Li_2CO_3$ and $Ti_3O_3$ were weighted so as to achieve the desired composition ratio, and were pulverized and mixed. Then, the mixed powder was calcined at 750° C. for 8 hours to produce $LiNi_{0.5}Mn_{1.37}Ti_{0.13}O_4$. It was confirmed that this positive electrode active material had a spinel conformation which has almost single phase. The positive electrode active material produced was mixed with carbon black that was an electroconductive-imparting agent, and this mixture was dispersed in a solution obtained by dissolving a polyvinylidene fluoride (PVDF) as a binder in N-methylpyrrolidone to prepare a positive electrode slurry. The mass ratio of the positive electrode active material, the electroconductive-imparting agent and the positive electrode binder was set to be 91/5/4. The positive electrode slurry was uniformly applied to both sides of a collector consisting of Al. After that, it was dried in vacuum for 12 hours, and was compressed and molded with a roll press to produce a positive electrode.

(Production of Negative Electrode)

Graphite as a negative electrode active material was dispersed in N-methylpyrrolidone in which a polyvinylidene fluoride (PVDF) as a negative electrode binder was dissolved, to prepare a negative electrode slurry. The mass ratio of the negative electrode active material and the negative electrode binder was set to be 90/10. The negative electrode slurry was uniformly applied to both sides of a Cu collector. After that, it was dried in vacuum for 12 hours, and was compressed and molded with a roll press to produce a negative electrode.

(Electrolyte Liquid)

A fluorinated ether (FE) represented by $H(CF_2)_2CH_2O(CF_2)_2H$, ethylene carbonate (EC) and dimethyl carbonate (DMC) were mixed so as to satisfy EC:DMC:FE=40:40:20 (mass ratio) to prepare a solvent. 1,3-propane sultone (PS) and $LiPF_6$ were mixed with the solvent so as to be 3 mass % and 1 M, respectively to prepare an electrolyte liquid.

(Production of Laminate-Type Battery)

The positive electrode and the negative electrode were cut to 1.5 cm×3 cm. 5 layers of the obtained positive electrode and 6 layers of the obtained negative electrode were alternately stacked with a polypropylene porous film as a separator placed therebetween. End parts of the positive electrode collectors which were not covered with the positive electrode active material and end parts of the negative electrodes collectors which were not covered with the negative electrode active material were respectively welded. Further, an aluminum positive electrode terminal and a nickel negative electrode terminal were respectively welded thereto, to obtain an electrode assembly which had a planar stacked configuration. The above-mentioned electrode assembly was enclosed in an aluminum lamination film as a package and the electrolyte liquid was poured thereinto, and it was then sealed with depressurization to produce a secondary battery.

Examples 2 to 11 and Comparative Examples 1 to 3

Batteries were produced in the same manner as in Example 1 except that the composition of the solvent and the additive was set as shown in TABLE 2.

Examples 12 to 14

Batteries were produced in the same manner as in Example 1 except that 1,4-butane sultone (BS) was used as the additive and that the amount added was set as shown in TABLE 2.

Examples 15 to 16

Batteries were produced in the same manner as in Example 1 except that methylene methanedisulfonate (MMDS) was used as the additive and that the amount added was set as shown in TABLE 2.

Examples 17 to 27

Batteries were produced in the same manner as in Example 1 except that a positive electrode active material shown in TABLE 3 was used. Note that, powders of $SiO_2$, MgO, $Na_2O$, $B_2O_3$, $Al_2O_3$, LiF, $Fe_2O_3$ and $Cr_2O_3$ were respectively used as raw materials of Si, Mg, Na, B, Al, F, Fe and Cr.

Reference Examples 1 to 3

Batteries were produced in the same manner as in Example 1 except that $LiMn_2O_4$ was used as the positive electrode active material and the composition of the solvent and the additive was set as shown in TABLE 3.

Examples 28 to 33

Batteries were produced in the same manner as in Example 1 except that a compound shown in TABLE 3 was used as the fluorinated ether.

(Cycle Test at High Temperature)

The cycle property at a high temperature of the battery produced as described above was evaluated. Cycling, in which the battery was charged to 4.8 V at 1 C and subsequently charged at a constant-voltage for 2.5 hours in total and then discharged to 3.0 V at 1 C at a constant-current, was repeated 300 times at 45° C. As the capacity retention ratio, the ratio of the discharge capacity after 300 cycles with respect to the first discharge capacity was calculated.

(Analysis of Sulfur Amount on Positive Electrode)

In Example 1 and Comparative Example 3, the quantitative analyses of the amount of sulfur contained in the positive electrode were carried out by fluorescent X-ray analysis method using a X-ray fluorescence spectrometer (made by Rigaku Industrial Corporation, trade name: ZSX PrimsII). The results of the quantified sulfur content of the positive electrode after 300 cycles in Example 1 and Comparative Example 1 are shown in TABLE 1. As shown in TABLE 1, the sulfur content after the cycle was confirmed to be larger in Example 1, in which an electrolyte liquid containing both a fluorinated ether and a cyclic-type sulfonate was used. Since only the cyclic-type sulfonate is a compound that contains a sulfur component in this battery system, the sulfur component confirmed in the positive electrode is thought to be derived from the cyclic-type sulfonate. In other words, it is assumed that the effect of the cyclic-type sulfonate as the positive electrode film is improved by containing a fluorinated ether as a solvent.

TABLE 1

| | electrolyte liquid | | | | positive electrode sulfur content [mass %] |
|---|---|---|---|---|---|
| | solvent composition [mass ratio] | | | additive | |
| | EC | DMC | FE | kind | mass % | |
| Ex. 1 | 40 | 40 | 20 | PS | 3 | 0.03 |
| Comp. Ex. 3 | 40 | 60 | 0 | PS | 3 | 0.01 |

The capacity retention ratios after 300 cycles at 45° C. in Examples 1 to 16 and Comparative Examples 1 to 3, in which the evaluations were carried out in the same condition as in Example 1 except that the solvent composition and the additive composition were changed, are shown in TABLE 2. As shown in Comparative Examples 1 to 3, in the case of a positive electrode operating at a potential of 4.5 V or higher, an electrolyte liquid containing either a fluorinated ether or a cyclic-type sulfonate did not produce the effect of improving the capacity retention ratio capacity. However, as shown in Examples 1 to 16, an electrolyte liquid containing both a fluorinated ether and a cyclic-type sulfonate produced the effect of improving the capacity retention ratio in a cycle at a high temperature of 45° C.

TABLE 2

| | electrolyte liquid | | | | | capacity retention ratio 45° C., 300 cycles (%) |
|---|---|---|---|---|---|---|
| | solvent composition [mass ratio] | | | additive | | |
| | EC | DMC | FE | kind | mass % | |
| Ex. 1 | 40 | 40 | 20 | PS | 3 | 66 |
| Ex. 2 | 50 | 30 | 20 | PS | 3 | 68 |
| Ex. 3 | 40 | 50 | 10 | PS | 3 | 64 |
| Ex. 4 | 40 | 55 | 5 | PS | 3 | 62 |
| Ex. 5 | 40 | 20 | 40 | PS | 3 | 60 |
| Ex. 6 | 30 | 10 | 60 | PS | 3 | 57 |
| Ex. 7 | 40 | 10 | 50 | PS | 3 | 58 |
| Ex. 8 | 40 | 40 | 20 | PS | 0.5 | 59 |
| Ex. 9 | 40 | 40 | 20 | PS | 1 | 63 |
| Ex. 10 | 40 | 40 | 20 | PS | 5 | 66 |
| Ex. 11 | 40 | 40 | 20 | PS | 10 | 65 |
| Ex. 12 | 40 | 40 | 20 | BS | 1 | 60 |
| Ex. 13 | 40 | 40 | 20 | BS | 3 | 62 |
| Ex. 14 | 40 | 40 | 20 | BS | 10 | 61 |
| Ex. 15 | 40 | 40 | 20 | MMDS | 1 | 67 |
| Ex. 16 | 40 | 40 | 20 | MMDS | 3 | 65 |
| Comp. Ex. 1 | 40 | 60 | 0 | — | — | 45 |
| Comp. Ex. 2 | 40 | 40 | 20 | — | — | 47 |
| Comp. Ex. 3 | 40 | 60 | 0 | PS | 3 | 49 |

Batteries were produced in the same condition as in Example 1 except that the kind of the positive electrode active material was changed, and were evaluated. The results are shown in TABLE 3. As shown in Example 1 and Examples 17 to 27, even if the kind of the positive electrode active material was changed, the batteries had a good cycle property.

TABLE 3

| | positive electrode | electrolyte liquid | | | | | capacity retention ratio 45° C., 300 cycles (%) |
|---|---|---|---|---|---|---|---|
| | | solvent composition [mass ratio] | | | additive | | |
| | | EC | DMC | FE | kind | mass % | |
| Ex. 1 | $LiNi_{0.5}Mn_{1.37}Ti_{0.13}O_4$ | 40 | 40 | 20 | PS | 3 | 66 |
| Ex. 17 | $LiNi_{0.5}Mn_{1.48}Ti_{0.02}O_4$ | 40 | 40 | 20 | PS | 3 | 66 |
| Ex. 18 | $LiNi_{0.5}Mn_{1.45}Si_{0.05}O_4$ | 40 | 40 | 20 | PS | 3 | 67 |
| Ex. 19 | $LiNi_{0.5}Mn_{1.45}Mg_{0.05}O_4$ | 40 | 40 | 20 | PS | 3 | 67 |
| Ex. 20 | $LiNi_{0.5}Mn_{1.45}Na_{0.05}O_4$ | 40 | 40 | 20 | PS | 3 | 64 |
| Ex. 21 | $LiNi_{0.5}Mn_{1.45}Li_{0.05}O_4$ | 40 | 40 | 20 | PS | 3 | 66 |
| Ex. 22 | $LiNi_{0.5}Mn_{1.45}B_{0.05}O_4$ | 40 | 40 | 20 | PS | 3 | 65 |
| Ex. 23 | $LiNi_{0.5}Mn_{1.45}Al_{0.05}O_{3.95}F_{0.05}$ | 40 | 40 | 20 | PS | 3 | 64 |
| Ex. 24 | $LiNi_{0.5}Mn_{1.5}O_4$ | 40 | 40 | 20 | PS | 3 | 60 |
| Ex. 25 | $LiNi_{0.25}Fe_{0.25}Mn_{1.5}O_4$ | 40 | 40 | 20 | PS | 3 | 55 |
| Ex. 26 | $LiNi_{0.25}Cr_{0.25}Mn_{1.5}O_4$ | 40 | 40 | 20 | PS | 3 | 57 |
| Ex. 27 | $LiFe_{0.5}Mn_{1.5}O_4$ | 40 | 40 | 20 | PS | 3 | 50 |
| Ref. Ex. 1 | $LiMn_2O_4$ | 40 | 40 | 0 | — | — | 83 |
| Ref. Ex. 2 | $LiMn_2O_4$ | 40 | 40 | 20 | — | — | 82 |
| Ref. Ex. 3 | $LiMn_2O_4$ | 40 | 40 | 20 | PS | 3 | 81 |

Batteries were produced in the same manner as in the Example 1 except that the kind of the fluorinated ether was changed, and the batteries were evaluated. The results are shown in TABLE 4. As shown in TABLE 4, even if the kind of the fluorinated ether was changed, the batteries had a good cycle property.

TABLE 4

| | kind of fluorinated ether | 45° C., after 300 cycles capacity retention ratio (%) |
|---|---|---|
| Ex. 1 | $H(CF_2)_2CH_2O(CF_2)_2H$ | 66 |
| Ex. 28 | $H(CHF)_2CH_2O(CHF)_2H$ | 57 |
| Ex. 29 | $(CF_3)(CF_2)CH_2O(CF_2)_2H$ | 62 |
| Ex. 30 | $H(CF_2)_2CH_2O(CF_2)_3H$ | 60 |
| Ex. 31 | $H(CF_2)_3CH_2O(CF_2)_2H$ | 61 |
| Ex. 32 | $CF_3(CF_2)CH_2O(CF_2)CF_3$ | 62 |
| Ex. 33 | $F(CF_2)_4OC_2H_5$ | 60 |

Examples 34 and 35

Batteries were produced in the same manner as in Example 1 except that a compound shown in TABLE 5 was used as the fluorinated ether.

Comparative Example 4

Battery was produced in the same manner as in Example 1 except that a non-fluorinated ether shown in TABLE 5 was used instead of the fluorinated ether.
(Measurement of Amount of Generated Gas)

In secondary batteries obtained in Examples 1 and 28 to 35 and Comparative Example 4, the amounts of generated gas after 100 cycles of charge and discharge at 45° C. were measured. The charge and discharge were carried out by a charge to 4.8 V at 1 C and a subsequent charge at a constant-voltage for 2.5 hours in total and by a discharge to 3.0 V at 1 C at a constant-current. The measurement of the amount of generated gas was carried out by cutting a part of the battery package and by quantifying the volume of gas which was collected by liquid displacement in paraffin at 25° C. The results are shown in TABLE 5.

TABLE 5

| | kind of fluorinated ether | (total number of fluorine atom)/ (total number of hydrogen atom) | 45° C., after 300 cycles amount of generated gas [cc] |
|---|---|---|---|
| Comp. Ex. 4 | $H(CH_2)_2CH_2O(CH_2)_2H$ | 0 | 2.7 |
| Ex. 1 | $H(CF_2)_2CH_2O(CF_2)_2H$ | 2.0 | 0.8 |
| Ex. 28 | $H(CHF)_2CH_2O(CHF)_2H$ | 0.5 | 2.2 |
| Ex. 29 | $F(CF_2)_2CH_2O(CF_2)_2H$ | 3.0 | 1.2 |
| Ex. 30 | $H(CF_2)_2CH_2O(CF_2)_3H$ | 2.5 | 1.1 |
| Ex. 31 | $H(CF_2)_3CH_2O(CF_2)_2H$ | 2.5 | 1.2 |
| Ex. 32 | $F(CF_2)_2CH_2O(CF_2)CF_3$ | 5.0 | 1.8 |
| Ex. 33 | $F(CF_2)_4OC_2H_5$ | 1.8 | 1.3 |
| Ex. 34 | $H(CHF)_3CH_2O(CF_2)_2H$ | 1.0 | 1.6 |
| Ex. 35 | $F(CF_2)_3CH_2O(CF_2)_2H$ | 3.7 | 1.7 |

From TABLE 5, it is understood that the amount of generated gas was further decreased in the case where (total number of fluorine atom)/(total number of hydrogen atom) in the fluorinated ether is in a range of 1.8 to 3.0.

As shown above, a constitution of an exemplary embodiment of the invention can provide a high voltage battery with improved operating life.

The present application claims the priority based on Japanese Patent Application No. 2011-065845, filed on Mar. 24, 2011, all the disclosure of which is incorporated herein by reference.

The present invention was explained with reference to embodiments and Examples, but the present invention is not limited to the above-mentioned embodiments and the Examples. In the constitutions and the detail of the present invention, various changes which are understood by a person ordinarily skilled in the art can be made within the scope of the invention.

REFERENCE SIGNS LIST 1 positive electrode active material layer
2 negative electrode active material layer
3 positive electrode collector
4 negative electrode collector
5 separator
6 package laminate
7 negative electrode lead terminal
8 positive electrode lead terminal

The invention claimed is:
1. A secondary battery, comprising a positive electrode that can absorb and desorb lithium and an electrolyte liquid;
wherein the positive electrode comprises a positive electrode active material that operates at a potential of 4.5 V or higher with respect to the standard electrode potential of lithium; and
wherein the electrolyte liquid comprises a fluorinated ether represented by following formula (5) and a cyclic-type sulfonate represented by following formula (2):

$$X^1—(CX^2X^3)_n—CH_2O—CX^4X^5—CX^6X^7—X^8 \quad (5)$$

wherein, in formula (5), n is 1 to 8 and $X^1$ to $X^8$ are each independently a fluorine atom or a hydrogen atom, in which at least one of $X^1$ to $X^3$ is a fluorine atom and at least one of $X^4$ to $X^8$ is a fluorine atom; and

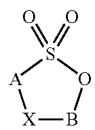

(2)

wherein, in formula (2), A and B each independently denote an alkylene group or a fluorinated alkylene group, and X denotes single bond or —$OSO_2$— group.
2. The secondary battery according to claim 1, wherein the positive electrode active material is a lithium manganese complex oxide represented by following formula (3):

$$Li_a(M_xMn_{2-x-y}Y_y)(O_{4-w}Z_w) \quad (3)$$

wherein, in formula (3), x, y, a and w satisfy 0.4≤x≤1.2, 0≤y, x+y<2, 0≤a≤1.2 and 0 ≤w ≤1, M comprises at least one selected from the group consisting of Co, Ni, Fe, Cr and Cu, Y is at least one selected from the group consisting of Li, B, Na, Mg, Al, Ti, Si, K and Ca, and Z is at least one selected from the group consisting of F and Cl.
3. The secondary battery according to claim 2, wherein a content of the fluorinated ether is 5 to 60 mass % with respect to a total amount of solvent in the electrolyte liquid.
4. The secondary battery according to claim 2, wherein the cyclic-type sulfonate is a cyclic-type monosulfonate represented by following formula (6):

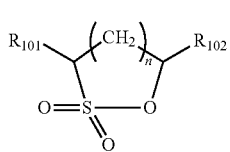

(6)

wherein, in formula (6), $R_{101}$ and $R_{102}$ each independently denote a hydrogen atom, a fluorine atom or an alkyl group with a carbon number of 1 to 4, and n is 1, 2, 3 or 4.

5. The secondary battery according to claim 2, wherein the cyclic-type sulfonate is a cyclic-type disulfonate represented by following formula (7):

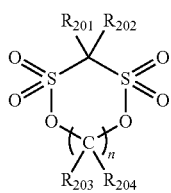

(7)

wherein, in formula (7), $R_{201}$ to $R_{204}$ each independently denote a hydrogen atom, a fluorine atom or an alkyl group with a carbon number of 1 to 4, and n is 1, 2, 3 or 4.

6. The secondary battery according to claim 1, wherein the positive electrode active material is a lithium manganese complex oxide represented by following formula (4):

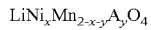

$LiNi_xMn_{2-x-y}A_yO_4$ (4)

wherein, in formula (4), x and y satisfy $0.4 < x < 0.6$ and $0 \le y < 0.3$, and A is at least one selected from the group consisting of Li, B, Na, Mg, Al, Ti and Si.

7. The secondary battery according to claim 6, wherein a content of the fluorinated ether in a solvent is 5 to 60 mass % with respect to a total amount of solvent in the electrolyte liquid.

8. The secondary battery according to claim 6, wherein the cyclic-type sulfonate is a cyclic-type monosulfonate represented by following formula (6):

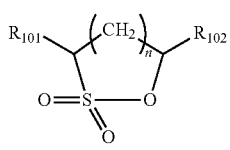

(6)

wherein, in formula (6), $R_{101}$ and $R_{102}$ each independently denote a hydrogen atom, a fluorine atom or an alkyl group with a carbon number of 1 to 4, and n is 1, 2, 3 or 4.

9. The secondary battery according to claim 6, wherein the cyclic-type sulfonate is a cyclic-type disulfonate represented by following formula (7):

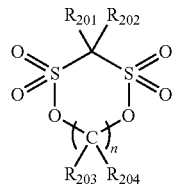

(7)

wherein, in formula (7), $R_{201}$ to $R_{204}$ each independently denote a hydrogen atom, a fluorine atom or an alkyl group with a carbon number of 1 to 4, and n is 1, 2, 3 or 4.

10. The secondary battery according to claim 1, wherein, in formula (5), n is 1 to 4 and the atom ratio of fluorine atoms and hydrogen atoms ((total number of fluorine atoms)/(total number of hydrogen atoms)) is 1.8 to 3.0.

11. The secondary battery according to claim 1, wherein a content of the fluorinated ether is 5 to 60 mass % with respect to a total amount of solvent in the electrolyte liquid.

12. The secondary battery according to claim 1, wherein the cyclic-type sulfonate is a cyclic-type monosulfonate represented by following formula (6):

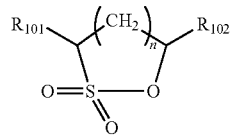

(6)

wherein, in formula (6), $R_{101}$ and $R_{102}$ each independently denote a hydrogen atom, a fluorine atom or an alkyl group with a carbon number of 1 to 4, and n is 1, 2, 3 or 4.

13. The secondary battery according to claim 1, wherein the cyclic-type sulfonate is a cyclic-type disulfonate represented by following formula (7):

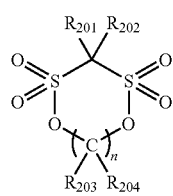

(7)

wherein, in formula (7), $R_{201}$ to $R_{204}$ each independently denote a hydrogen atom, a fluorine atom or an alkyl group with a carbon number of 1 to 4, and n is 1, 2, 3 or 4.

14. The secondary battery according to claim 1, wherein a content of the cyclic-type sulfonate in the electrolyte liquid is 0.01 to 10 mass %.

15. The secondary battery according to claim 1, wherein the electrolyte liquid further comprises a carbonate compound.

* * * * *